(12) United States Patent
Yoshino et al.

(10) Patent No.: US 11,009,675 B2
(45) Date of Patent: May 18, 2021

(54) IMAGING APPARATUS, LENS APPARATUS, AND THEIR CONTROL METHODS

(71) Applicant: CANON KABUSHIKI KAISHA, Tokyo (JP)

(72) Inventors: Eiji Yoshino, Kawasaki (JP); Soichiro Hayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/233,815

(22) Filed: Dec. 27, 2018

(65) Prior Publication Data

US 2019/0204535 A1    Jul. 4, 2019

(30) Foreign Application Priority Data

Dec. 28, 2017  (JP) .............................. JP2017-253841

(51) Int. Cl.
*G02B 7/36* (2006.01)
*G03B 7/095* (2006.01)
(Continued)

(52) U.S. Cl.
CPC ................. *G02B 7/36* (2013.01); *G02B 7/09* (2013.01); *G02B 7/38* (2013.01); *G03B 7/095* (2013.01);
(Continued)

(58) Field of Classification Search
CPC . G02B 7/36; G02B 7/09; G03B 7/095; G03B 13/36; G03B 7/085; G03B 7/087; G03B 7/097; H04N 5/2351; H04N 5/2352
See application file for complete search history.

(56) References Cited

U.S. PATENT DOCUMENTS

2010/0054722 A1*  3/2010  Endo ...................... G03B 13/00
                                                                 396/98
2010/0232646 A1*  9/2010  Takeuchi ............... H04N 5/145
                                                                 382/103
(Continued)

FOREIGN PATENT DOCUMENTS

JP            6183241 B     4/2013
JP       2017-040879 A     2/2017
JP       2017-067857 A     4/2017

*Primary Examiner* — Sinh Tran
*Assistant Examiner* — Zhenzhen Wu
(74) *Attorney, Agent, or Firm* — Cowan, Liebowitz & Latman, P.C.

(57) ABSTRACT

An imaging apparatus includes a focus detector configured to perform a focus detection based on a signal output from the image sensor corresponding to the first imaging, a calculator configured to calculate a first time corresponding to the second imaging, and a focus controller configured to perform a focus control for driving the focus lens to an in-focus position predicted at the first time based on a focus detection result. The calculator calculates the first time in accordance with whether the aperture control corresponding to the attached lens apparatus is a first aperture control for driving the aperture to a target aperture value via a predetermined aperture value from the aperture value before the aperture control or a second aperture control for driving the aperture to the target aperture value directly from the aperture value before the aperture control.

20 Claims, 9 Drawing Sheets

(51) Int. Cl.
*H04N 5/235* (2006.01)
*G02B 7/09* (2021.01)
*G03B 13/36* (2021.01)
*G02B 7/38* (2021.01)

(52) U.S. Cl.
CPC ........... *G03B 13/36* (2013.01); *H04N 5/2351* (2013.01); *H04N 5/2352* (2013.01)

(56) References Cited

U.S. PATENT DOCUMENTS

| | | | | |
|---|---|---|---|---|
| 2012/0327267 | A1* | 12/2012 | Takahara | H04N 5/23209 348/231.99 |
| 2013/0286489 | A1* | 10/2013 | Asano | G02B 7/20 359/739 |
| 2014/0300792 | A1* | 10/2014 | Nakamura | H04N 5/23212 348/333.08 |
| 2016/0037040 | A1* | 2/2016 | Asano | H04N 5/23212 348/364 |
| 2017/0310867 | A1* | 10/2017 | Tsukamoto | G02B 5/005 |

* cited by examiner

IMAGING APPARATUS, LENS APPARATUS, AND THEIR CONTROL METHODS

BACKGROUND OF THE INVENTION

Field of the Invention

The present invention relates to an imaging apparatus (image capturing apparatus) that can provide an aperture control and a focus control.

Description of the Related Art

One known imaging apparatus predicts a position of a moving object a predetermined time later or makes a focus control follow a so-called moving object prediction result. The focus control that focuses on the object at a future still imaging time using the moving object prediction result can provide a still image focused on the moving object.

The actual still imaging time can vary depending on various factors. Any shifts between the actual still imaging time and the still imaging time predicted by the moving object prediction may not provide a focused still image.

The imaging apparatus disclosed in Japanese Patent No. ("JP") 5183241 calculates the still imaging time assumed based on the aperture driving time (which is the time required to drive the aperture to a target F-number (aperture value), and referred to as an "aperture control time" hereinafter) acquired from the mounted interchangeable lens. The moving object prediction and focus control are performed so that the object is focused at the still imaging time.

JP 5183241 can make smaller a shift between the actual still imaging time and the still imaging time assumed in the moving object prediction than that with the still imaging time assumed without considering the aperture driving time, and can more accurately focus on the object.

However, JP 5183241 does not consider an aperture control with which the mounted interchangeable lens is compatible. The actual still imaging time and the still imaging time assumed by the moving object prediction can shift from each other, where the aperture control time necessary for the aperture control differs depending on the compatible aperture control unless the aperture control time corresponding to the aperture control is considered. Any shifts between the actual still imaging time and the still imaging time assumed by the moving object prediction may not provide a focused still image as described above.

SUMMARY OF THE INVENTION

The present invention provides an imaging apparatus or the like that can acquire a more accurately focused still image on a moving object than prior art.

An imaging apparatus according to the present invention to which a lens apparatus having an aperture is attachable includes an image sensor, an imaging controller configured to control driving of the image sensor so as to perform first imaging and second imaging performed after the first imaging, an aperture controller configured to perform an aperture control for driving the aperture before the second imaging using a light metering result obtained by the first imaging, a focus detector configured to perform a focus detection based on a signal output from the image sensor corresponding to the first imaging, a calculator configured to calculate a first time corresponding to the second imaging, and a focus controller configured to perform a focus control for driving the focus lens to an in-focus position predicted at the first time based on a focus detection result. The calculator calculates the first time in accordance with whether the aperture control corresponding to the attached lens apparatus is a first aperture control for driving the aperture to a target aperture value via a predetermined aperture value from the aperture value before the aperture control or a second aperture control for driving the aperture to the target aperture value directly from the aperture value before the aperture control.

A control method of an imaging apparatus according to another aspect of the present invention to which a lens apparatus having an aperture is attachable, the control method includes the steps of controlling driving of the image sensor so as to perform first imaging and second imaging performed after the first imaging, performing an aperture control for driving the aperture before the second imaging using a light metering result obtained by the first imaging, performing a focus detection based on a signal output from the image sensor corresponding to the first imaging, calculating a first time corresponding to the second imaging, and performing a focus control for driving the focus lens to an in-focus position predicted at the first time based on a focus detection result. The calculating step calculates the first time in accordance with whether the aperture control corresponding to the attached lens apparatus is a first aperture control for driving the aperture to a target aperture value via a predetermined aperture value from the aperture value before the aperture control or a second aperture control for driving the aperture to the target aperture value directly from the aperture value before the aperture control.

A non-transitory computer-readable storage medium according to still another aspect of the present invention stores a computer program for causing a computer of an imaging apparatus to which a lens apparatus having an aperture is attachable, to execute processing in the above control method.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
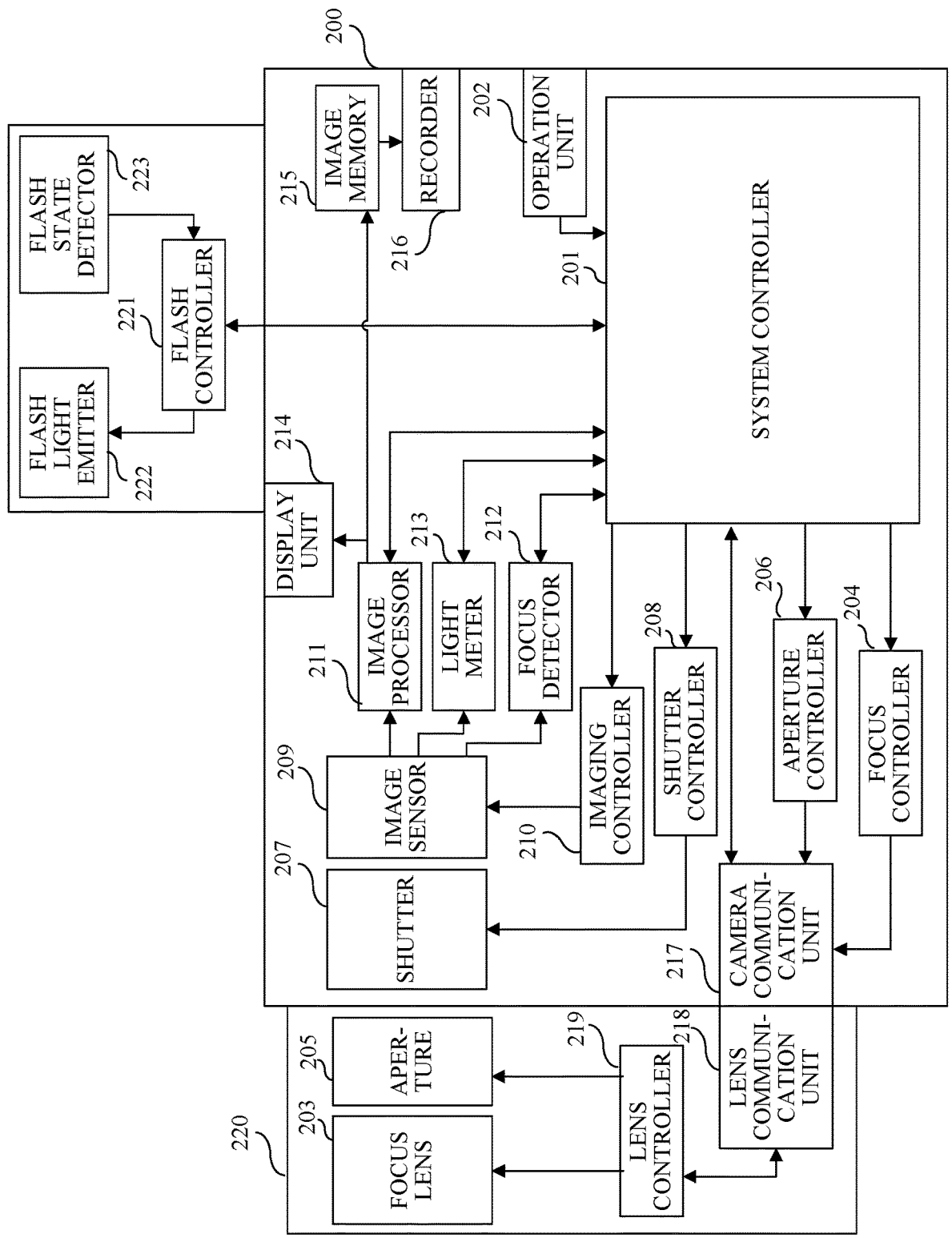
FIG. 1 is a block diagram illustrating a configuration of an imaging apparatus according to a first embodiment (and a second embodiment).

A first embodiment according to the present invention will discuss an imaging apparatus capable of performing a focus control based on a result of a moving object prediction. FIG. 1 illustrates an imaging apparatus (referred to as a "camera body" hereinafter) 200 according to this embodiment and a lens unit (lens apparatus) 220 detachably attached to the camera body 200. The lens unit 220 has an imaging optical system including a focus lens 203 and a variable aperture (diaphragm and simply referred to as a "aperture" hereinafter) 205.

A system controller 201 is a microcomputer including a CPU or MPU and a memory (DRAM, SRAM) and the like. The system controller 201 executes a computer program, performs various processing, controls each unit in the camera body 200, and controls data transfer between the units. The system controller 201 controls each unit in the camera body 200 according to an operation signal from an operation unit 202 that receives an operation from a user. The operation unit 202 includes a switch and the like for inputting an imaging relating operation such as a power button, a shutter button, a menu display button, an enter button, a cursor key, a pointing device, a touch panel, and the like. The operation unit 202 outputs an operation signal to the controller 201 by detecting the operation by the user.

A communication terminal for transmitting and receiving data is provided in an unillustrated mount portion between the camera body 200 and the lens unit 220. The system controller 201 communicates with a lens controller 219 in the lens unit 220 via a camera communication unit 217 in the camera body 200 and a lens communication unit 218 in the lens unit 220. For example, the system controller 201 acquires lens identification information (lens ID) including unique information such as the model and serial number from the lens unit 220, transmits a command to the lens controller 219, and controls each unit in the lens unit 220.

The lens controller 219 is a microcomputer that controls the operation of each unit in the lens unit 220, such as the focus lens 203 and the aperture 205. The focus lens 203 is a lens for focusing an optical image (object image) formed on an image sensor 209. In response to the command from the system controller 201, a focus controller 204 controls the position of the focus lens 203 so that an image plane position obtained by a focus detector 212 accords with the imaging plane position of the image sensor 209, or is focused on the object.

In this embodiment, the image plane position is a focus position corresponding to the imaging lens 120 (also referred to as an "image plane position of the imaging lens" or a "lens image plane position"). The image plane position of the object is a focus position where the imaging lens 201 is focused on the object. In other words, the image plane position of the object is a focus position calculated based on the focus detection result of the current focus lens position at a focus detection time of the object.

More specifically, the focus controller 204 transmits a focus control command to the lens controller 219. The focus control command includes information on a driving amount (including a driving direction) of the focus lens 203. In accordance with the received focus control command, the lens controller 219 drives an illustrated focus actuator to move the focus lens 203.

In place of or in addition to the focus lens 203, the focus control may be performed by moving the image sensor 209.

An aperture (or diaphragm) 205 adjusts a light amount entering the image sensor 209 for a proper exposure to the image sensor 209. Upon receiving an instruction from the system controller 201, an aperture controller 206 controls the F-number (aperture value) of the aperture 205 according to the brightness information (light metering result) of the object obtained by a light meter 213. More specifically, the aperture controller 206 transmits an aperture control command to the lens controller 219. The aperture control command includes information on a driving amount (including a driving direction) of the aperture 205. The lens controller 219 controls the aperture 205 (F-number) by driving an unillustrated aperture actuator in accordance with the received aperture control command.

The shutter 207 opens and closes in order to control the exposure to the image sensor 209. The shutter controller 208 controls opening and closing of the shutter 207 in response to the instruction from the system controller 201. In the still imaging, the shutter controller 208 controls the shutter 207 to open for a period used for the image sensor 209 to accumulate (electric) charges, and to close the shutter 207 for a period used to read the accumulated charges. The accumulated charge from the image sensor 209 may be read by an electronic shutter control while the shutter 207 is opened.

The image sensor 209 includes a CMOS sensor and a peripheral circuit thereof, converts an object image formed by the imaging optical system in the lens unit 220 into electric charges, and accumulates them. Then, the analog image signal as the electric signal generated by reading the accumulated charges is converted into a digital image signal and output to an image processor 211, the focus detector 212, and the light meter 213.

The system controller (imaging controller) 201 drives the image sensor (image pickup element) so as to cause the image sensor 209 to perform three imaging types as described later. In other words, the system controller 201 instructs the image sensor 209 to perform still imaging (second imaging) for generating a still image for recording use in accordance with an imaging instruction from the user. The system controller 201 also instructs the image sensor 209 to perform live-view imaging for generating a motion image for display use for framing by the user before the still imaging. Moreover, the system controller 201 instructs the image sensor 209 to perform imaging for obtaining a signal for a focus detection result so as to perform a focus detection that detects the focus state of the imaging optical system, or to acquire a light metering signal for detecting the object brightness, or the imaging (first imaging) for acquiring an image signal for evaluation use.

Figure 10:
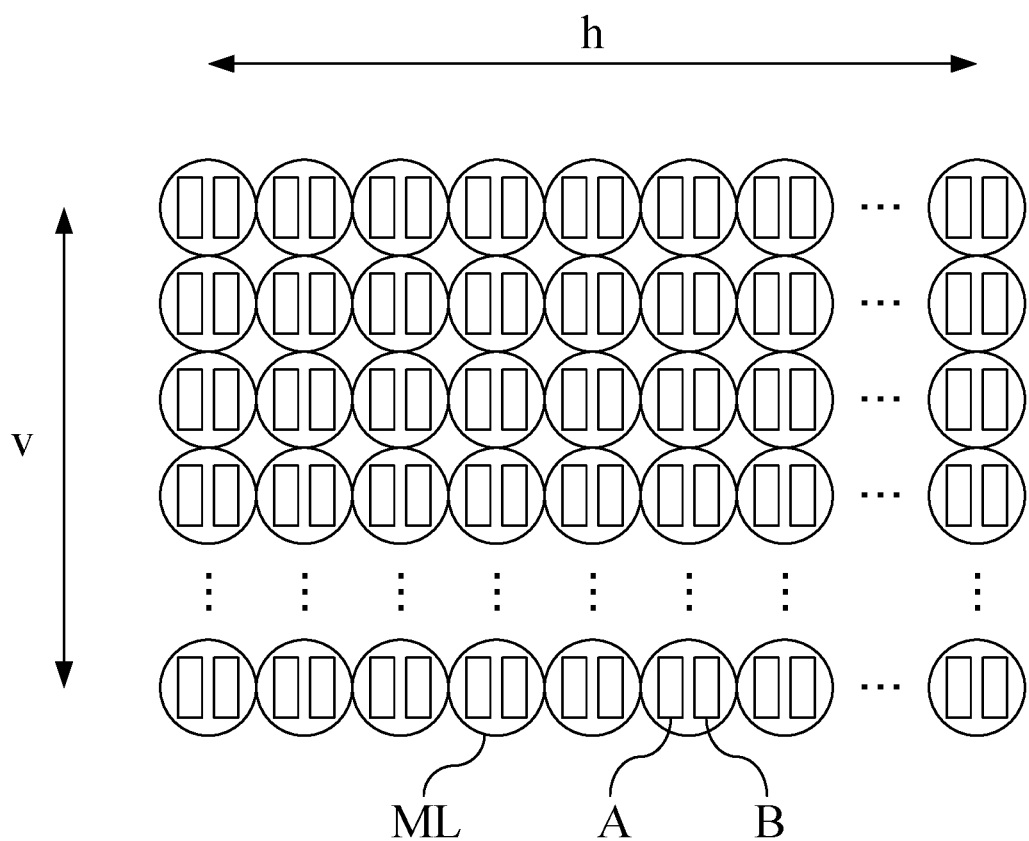
FIG. 10 illustrates a configuration of an image sensor according to the first embodiment.

As illustrated in FIG. 10, the image sensor 209 has a plurality of pixel portions with h pixels arranged in the horizontal direction and v pixels arranged in the vertical direction (h and v are natural numbers). Each pixel portion has a first photoelectric converter A and a second photoelectric converter B, which a pair of light beams made by the object image divided on the exit pupil plane enter. A micro lens ML for light condensing use is disposed on a front surfaces of the first photoelectric converter A and the second photoelectric converter B. Each pixel portion has one of red, green, and blue color filters (not illustrated). The color filters are arranged in the known Bayer array.

Adding the charges of the first photoelectric converter A and the second photoelectric converter B to each other can provide charges necessary to generate still image data for recording use.

On the other hand, the focus detection is available with signals corresponding to charges of the first photoelectric converter A and the second photoelectric converter B. This is because the area on the exit pupil through which the light beam received by the first photoelectric converter A passes and the area on the exit pupil through which the light beam received by the first photoelectric converter B passes are different from each other. In other words, the first photoelectric converter A and the second photoelectric converter B photoelectrically convert a pair of object images (two images) having a parallax to each other and output the pair of electric signals. Accordingly, a signal corresponding to one row of image signals (also referred to as an "A image signal") acquired from the first photoelectric converter A column and a signal corresponding to one row of image signals (also referred to as a "B image signal") acquired from the second photoelectric converter B column are obtained, a phase difference (image shift amount) between the pair of image signals is calculated, and a defocus amount indicating a focus state of the imaging optical system can be detected based on the phase difference. A focus detection method that performs a focus detection based on a phase difference between a pair of image signals having a parallax is referred to as a phase difference detection method.

The focus detector 212 and the light meter 213 respectively acquire the focus detection result using the image signal output from the image sensor 209 and calculate the object brightness.

The focus detection accuracy in the focus detection with the image sensor 209 decreases as the aperture 205 is narrowed, and it is thus necessary to set the F-number of the aperture 205 on the open side of a certain F-number (such as F8).

In accordance with an instruction from the system controller 201, the image sensor controller 210 switches the imaging type performed by the image sensor 209, controls the charge accumulation start timing (imaging time) in each imaging and the accumulated charges read timing. The image sensor controller 210 and the system controller 201 constitute an imaging controller.

The image processor 211 generates an image signal by performing image processing, such as white balance processing, color adjustment processing, and brightness adjustment processing, for the digital imaging signal input from the image sensor 209. The image signal generated by the image processor 211 is sent to a display unit 214 as image data for display use or sent to the image memory 215 as image data for recording use. The image processor 211 performs image analysis processing for the input digital image signal to extract object information. The object information contains information indicating whether there is a specific object such as a person (face) and information on the position of the specific object. The extracted object information is sent to the system controller 201.

The focus detector 212 detects a defocus amount based on the focus detection result signal obtained from the evaluation imaging as described above. The light meter 213 acquires the object brightness based on the signal obtained by the evaluation imaging. More specifically, the brightness of the object is obtained by finding the luminance in the entire image or the predetermined light metering area based on the image signal from the image sensor 209. The focus detector 212 and the focus controller 204 constitute a focus controller.

The display unit 214 displays the image data for display use generated by the image processor 211 as a live-view image, and displays an operation image (menu image) etc. for the user to operate the camera body 200. The display unit 214 includes a display device, such as a liquid crystal display, an organic EL display, and an electronic paper.

An image memory 215 temporarily stores the image data for recording use, and sequentially writes the image data into a recorder 216. The written image data for recording use is deleted from the image memory 215. Thereby, the consecutive imaging can store the sequentially generated image data for recording use.

The recorder 216 records the image data for recording use stored in the image memory 215 on a recording medium. The recording medium may be a recording medium built in or removable from the camera body 200. The recording medium includes recording media of any recording types such as a hard disk drive, an optical disk, a magneto-optical disk, a CD-R, a DVD-R, a magnetic tape, a nonvolatile semiconductor memory, and a flash memory.

In response to an instruction from the system controller 201, a flash controller controls a flash light emitter 222. The flash light emitter 222 emits the light at a light emittable position popped up from a storage position stored in the camera body 200, automatically according to the user operation or the object brightness obtained by the light meter 213. A flash state detector 223 detects that the flash light emitter 222 has popped up to the light emittable position, and notifies the flash controller 221 of it. The flash controller 221 causes the flash light emitter 222 to emit light only when the flash light emitter 222 is located at the light emittable position by the flash state detector 223 and to irradiate the illumination light onto the object.

The flash light emitter 222 receives an instruction of light emission timing and light emission amount (guide number) from the flash controller 221, and emits the illumination light according to the light emission timing and light emission amount.

Next follows a description of a characteristic operation of the camera body 200 according to this embodiment. This embodiment appropriately calculates the imaging scheduled timing in accordance with the lens unit (use or operational lens apparatus, referred to as a "use lens unit" hereinafter) attached to the camera body 200 in each still imaging in the consecutive imaging for a moving object. Moreover, this embodiment properly calculates a time (first time, such as a scheduled time of an accumulation start as described later) corresponding to the still imaging according to the aperture control (method) corresponding to the use lens unit. This embodiment can obtain a still image for recording use focused on the moving object, regardless of the aperture control with which the use lens unit is compatible, based on the thus-calculated time, e.g., based on the moving object prediction and the focus control based on the moving object prediction.

Consecutive Imaging Processing

Figure 2:
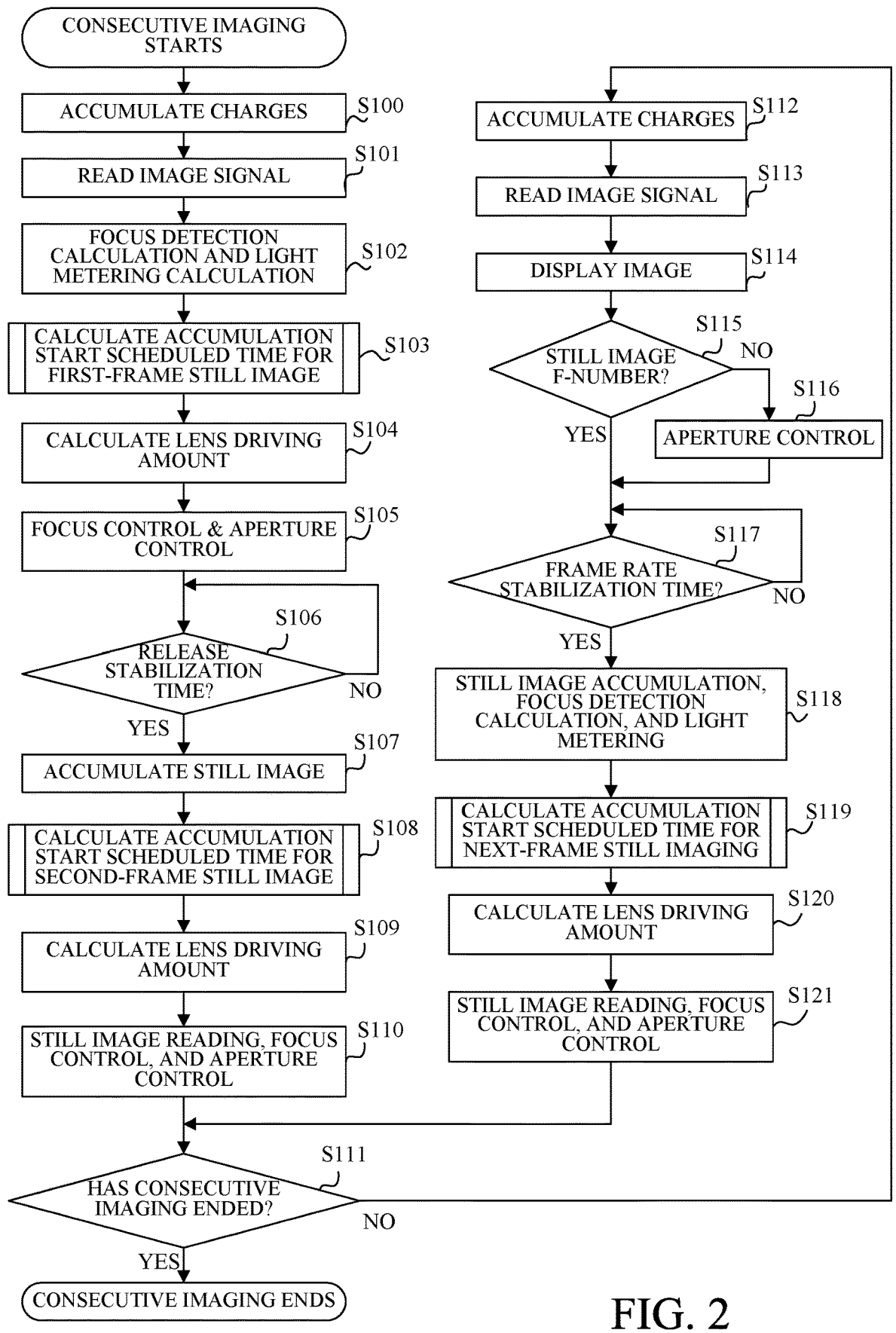
FIG. 2 is a flowchart illustrating consecutive imaging processing according to the first embodiment.

Referring now to FIG. 2, a description will be given of consecutive imaging processing according to this embodiment. The system controller 201 as the imaging controller performs this processing according to the computer program. In the following description, S stands for the step.

In response to the user pressing shutter button included in the operation unit 202, the system controller 201 sends an instruction to start the consecutive imaging to each unit in the camera body 200.

In S100, the system controller 201 causes the image sensor 209 to start the accumulating charges (accumulating charges for evaluation use) for evaluation imaging via the image sensor controller 210. The charge accumulation for the evaluation use may also serve as the charge accumulation for live-view imaging.

Next, in S101, the system controller 201 causes the image sensor 209 to read the accumulated charges and to output an image signal.

In S102, the system controller 201 causes the focus detector 212 to perform the focus detection calculation for performing the focus detection based on the image signal and to obtain the focus detection result. In addition, the system controller 201 instructs the light meter 213 to perform the light metering calculation for calculating the object brightness based on the signal output from the image sensor 209 in S101. In the focus detection calculation and the light metering calculation, the calculation is made so that the in-focus state and the optimum exposure can be obtained at a position of a specific object detected as the object information by the image processor 211. For example, this embodiment focuses on the detected specific object, makes larger the weight of the light metering result at the position of the specific object, and performs the exposure setting based on the light metering result. Due to the light metering calculation, this embodiment sets the charge accumulation time for the first-frame still imaging (first imaging) in the consecutive imaging and the charge accumulation time in the evaluation imaging (second imaging) after the first-frame still imaging.

Next, in S103, the system controller 201 calculates a charge accumulation scheduled time for the first-frame still imaging following this step. This embodiment describes a calculation of an accumulation start scheduled time as a charge accumulation scheduled time, but may calculate a time for specifying the charge accumulation scheduled time, such as a center time of the charge accumulation scheduled time. Detailed calculation processing of the accumulation start scheduled time will be given later with reference to FIG. 4.

Next, in S104, the system controller 201 calculates a lens driving amount for driving the focus lens 203 so as to focus on the object at the accumulation start time in capturing the first-frame still image based on the focus detection result obtained by the focus detection calculation. This embodiment calculates the lens driving amount, for example, by performing a so-called moving object prediction.

The moving object prediction according to this embodiment performs a prediction calculation to predict the image plane position of the object at the charge accumulation scheduled time for the first-frame still imaging. Then, this embodiment calculates the lens driving amount of the focus lens 203 based on the predicted image plane position.

In imaging a moving object, the in-focus state may not be obtained at the accumulation start time for the actual still imaging because the moving object moves from the focus detection time to the actual accumulation start time for still imaging, even when the position of the focus lens 203 for obtaining the in-focus state is determined simply based on the acquired focus detection result (defocus amount in this embodiment). Therefore, this embodiment calculates, in S103, the accumulation start scheduled time for still imaging, predicts the image plane position of the object at the scheduled time before the accumulation start time for the actual still imaging, and provides controls so as to move the focus lens 203 based on the predicted image plane position and to obtain the in-focus state on the object at the accumulation start time for the actual still imaging.

It is a known technology to move the focus lens 203 so as to obtain the in-focus state at a desired time by predicting the image plane position of the object at a future time. For example, each of Japanese Patent Application Laid-Open Nos. 2017-040879 and 2017-067857 discloses a method of predicting an image plane position of an object at a future time by using a plurality of focus detection results obtained in the past, of calculating a lens driving amount for driving a focus lens to a lens position corresponding to the predicted image plane position, and of driving the focus lens. In this embodiment, the system controller 201 acquires the focus detection result and the light metering result on the regular basis before the consecutive imaging starts, and stores them in the memory in the system controller 201. Hence, where a plurality of focus detection results are used to calculate the lens driving amount, the focus detection result acquired before the consecutive imaging starts can be used.

The above method is not limited as long as the focus lens can be driven based on the accumulation start scheduled time so that the object is focused at the accumulation start time for the actual still imaging.

In S105, the system controller 201 moves the focus lens 203 through the focus controller 204 based on the lens driving amount calculated in S104. In other words, the focus control is performed. This configuration can focus on the moving object in the first-frame still imaging. The system controller 201 controls the aperture 205 through the aperture controller 206 in accordance with the object brightness obtained by the light metering calculation in S102. In other words, the aperture control is performed. As a result, the proper exposure can be obtained in the first-frame still imaging. The focus control and the aperture control performed in this step correspond to the preparation operation. This embodiment controls the aperture corresponding to the aperture control method with which the use lens unit is compatible, and this aperture control will be described later in detail.

Next, in S106, the system controller 201 determines whether a predetermined tune has elapsed since the user pressed the shutter button, and if not, the flow returns to S106, and if so, the flow proceeds to S107. The camera body 200 has a release stabilization function for keeping the period constant from when the shutter button is pressed to when the charge accumulation start time for the first-frame still imaging elapses, even when the imaging condition, such as the temperature, changes. As described above, the release stabilization function is realized by waiting for the predetermined time to elapse.

In S107, the system controller 201 performs first-frame still imaging (charge accumulation) for acquiring image data for recording use of a still image (referred to as "still image data for recording use" hereinafter).

Figure 5:
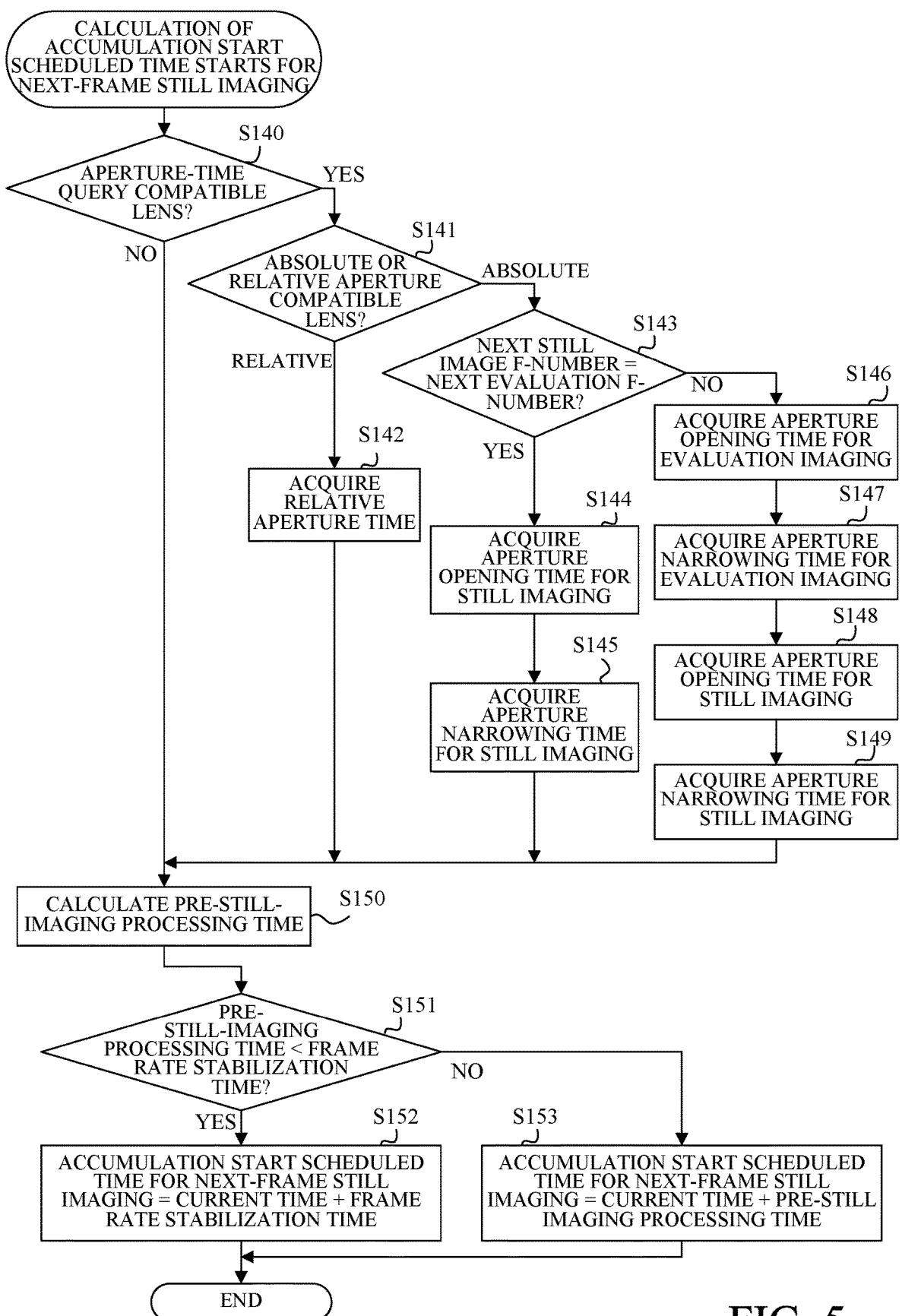
FIG. 5 is a flowchart illustrating other calculation processing of a still image accumulation time according to the first embodiment.

Next, in S108, the system controller 201 calculates (sets) the accumulation start scheduled time for the second-frame still imaging. Referring to FIG. 5, a detailed description will be given of the accumulation start scheduled time calculation processing.

In S109, the system controller 201 calculates the lens driving amount by which it is predicted that the object is focused at the accumulation start time for the second-frame still imaging. The method of calculating the lens driving amount is the same as that described in S104. S109 is similar to S104 in that the system controller 201 calculates the lens driving amount based on the past focus detection result including the focus detection result obtained in S102, but is different from S104 in that the adopted accumulation start scheduled time is the scheduled time calculated in S108.

Next, in S110, the system controller 201 controls closing of the shutter 207 through the shutter controller 208, and instructs the image processor 211 to generate first-frame still image data for recording use based on the image signal output from the image sensor 209.

While reading the image signal used to generate the first-frame still image data for recording (before the second-frame still imaging), the system controller 201 instructs the focus controller 204 to move the focus lens 203 by the lens driving amount calculated in S109. In other words, the focus control is performed. Thereby, the still image data for recording use focused on the moving object can be obtained in the second-frame still imaging. Before the second-frame still imaging, the system controller 201 controls the aperture 205 through the aperture controller 206 in accordance with the conditions of the object brightness obtained by the light metering calculation in S102 and the F-number for the evaluation imaging in later S112. In other words, the aperture control is performed. This configuration can provide a proper exposure in the second-frame still imaging, and perform the highly accurate focus control for the second-frame still imaging.

The F-number condition for the evaluation imaging uses the F-number that does not lower the focus detection accuracy in the above phase difference detection method and is as close as possible to a proper F-number for still imaging after the evaluation imaging. More specifically, it is F8 or smaller (closer to the open side). If F4 is the proper F-number for the second-frame still imaging, the F-number for the evaluation imaging is also set to F4 because F4 is located on the open side of F8. If F11 is the proper F-number for the second-frame still imaging, the F-number for the evaluation imaging is set to F8 since F11 is located on a smaller aperture side than (or F11 is larger than) F8. The following description will refer to the F-number that satisfies the above condition as an evaluation F-number, and a proper F-number for still imaging as a still image F-number.

Next, in S111, the system controller 201 determines whether the shutter button is continuously pressed by the user, or whether to continue or terminate the consecutive imaging processing. In continuing the consecutive imaging processing, the system controller 201 proceeds to S112, and in terminating the consecutive imaging processing, the system controller 201 ends the consecutive imaging.

In S112, the system controller 201 instructs the image sensor 209 to start the accumulating the charges for evaluation imaging (and live-view imaging).

Next, in S113, the system controller 201 instructs the image sensor 209 to read the accumulated charges and to output an imaging signal.

In S114, the system controller 201 instructs the image processor 211 to generate image data for display use (captured image) based on the image signal output from the image sensor 209 in S113, and instructs the display unit 214 to display it. Since the latest captured image in the consecutive imaging is displayed, the user can capture an image while conveniently confirming the object.

Next, in S115, the system controller 201 determines whether the current F-number of the aperture 205 is the above still image F-number. If so, the flow proceeds to S117, and if not, the flow proceeds to S116. When the still image F-number is F4 as in the above example, the flow proceeds to S117 since the still image F-number=the evaluation F-number. On the other hand, when the still image F-number is F11, the flow proceeds to S116 since the still image F-number≠the evaluation F-number.

In S116, the system controller 201 controls the aperture 205 through the aperture controller 206 so that the F-number becomes the still image F-number. Then, the flow proceeds to S117.

In S117, the system controller 201 determines whether a predetermined time has elapsed since the last frame imaging time. If not, the flow returns to S117, and if so, the flow proceeds to S118. The camera body 200 has a frame rate stabilizing function for keeping constant the frame rate in the consecutive imaging, even if the imaging condition changes. Waiting for the predetermined time to elapse in S117 realizes the frame rate stabilizing function.

In S118, the system controller 201 performs the still imaging. In the charge accumulation in the still imaging, the system controller 201 instructs the focus detector 212 to perform the focus detection calculation that performs the focus detection based on the image signal or based on the signal output from the image sensor 209 in S113, and to obtain the focus detection result. In addition, the system controller 201 instructs the light meter 213 to perform the light metering calculation based on the signal focus detection result output from the image sensor 209 in S113. When the F-number is the F-number for the evaluation imaging in S115, the focus detection calculation and the light metering calculation may be performed in S116 while the aperture control is performed with the still image F-number. In addition, the light metering calculation sets the charge accumulation time in the next-frame still imaging and evaluation imaging.

Next, in S119, the system controller 201 calculates the accumulation start scheduled time for the next-frame still imaging (for the third and subsequent frames). Referring now to FIG. 5, a detailed description will be given of the calculation processing of the accumulation start scheduled time.

Next, in S120, the system controller 201 calculates a lens driving amount for driving the focus lens 203 so as to focus on the object at the accumulation start scheduled time for the next-frame still imaging using the focus detection result obtained by the focus detection calculation in S118. The method of calculating the lens driving amount is similar to S104 and S109 but different from them in that the accumulation start scheduled time used to calculate the lens driving amount is calculated in S119 and that the newly calculated focus detection result is used for S118.

Next, in S121, the system controller 201 controls closing of the shutter 207 through the shutter controller 208, instructs the image sensor 209 to read the image signal based on the accumulated charges, and the image processor 211 to generate still image data for recording use. In reading the image signal from the image sensor 209 at this time, the system controller 201 moves the focus lens 203 through the focus controller 204 based on the lens driving amount calculated in S120. Thereby, the still image data for recording use can be obtained which is focused on the moving object in the next-frame still imaging. In addition, before the still imaging of the next frame, the system controller 201 controls the aperture 205 through the controller 206 in accordance with the conditions of the object brightness obtained by the light metering calculation in S118 and the F-number for the evaluation imaging in the next S112. This configuration can provide a proper exposure in the next-frame still imaging. Then, the flow returns to S111.

The processing from S112 to S121 is repeated until it is determined in S111 that consecutive imaging ends. In this manner, the consecutive imaging is performed which repeats the evaluation imaging (and live-view imaging), the preparation operation including the aperture control and the focus control, and the still imaging in this order.

Aperture Control Corresponding to Aperture Control Method with which Use Lens Unit is Compatible Referring now to a flowchart in FIG. 3, a description will be given of an aperture control according to an aperture control method with which the use lens unit 220 is compatible, which is performed by the aperture controller 206 instructed by the system controller 201. In S105, S110, S116, and S121 in FIG. 2, the aperture controller 206 controls the aperture 205 in the use lens unit 220, but the aperture control differs depending on the aperture control method with which the use lens unit 220 is compatible. The aperture controller 206 also includes a microcomputer, and performs the aperture control according to a computer program.

In S160, the aperture controller 206 determines whether the use lens unit 220 is compatible with an absolute aperture control (first aperture control) or a relative aperture control (second aperture control). The absolute aperture control is an aperture control method that drives the F-number from the (current) F-number before the aperture control to a target F-number such as the still image F-number through a predetermined F-number. The relative aperture control is an aperture control method that drives directly from the (current) F-number before aperture control to the target F-number (in other words, drives the aperture by an amount corresponding to the difference between the current F-number and the target F-number).

More specifically, the system controller 201 acquires the lens ID from the use lens unit 220. The lens ID includes information indicating whether the use lens unit 220 is a lens compatible with the absolute aperture control (referred to as an "absolute aperture compatible lens" hereinafter) or a lens compatible with the relative aperture control (referred to as a "relative aperture compatible lens" hereinafter). If the use lens unit 220 is the absolute aperture compatible lens, the system controller 201 proceeds to S162, and if the use lens unit 220 is the relative aperture compatible lens, the system controller 201 proceeds to S161.

The system controller 201 may acquire the lens ID by the initial communication when the use lens unit 220 is attached to the camera body 200 or may acquire the lens ID before the determination in S160. Whether the use lens unit 220 is the absolute aperture compatible lens or the relative aperture compatible lens is determined not at the timing of the aperture control but only once when the use lens unit 220 is attached to the camera body 200 and the result may be stored in the memory in the camera body 200. This configuration can reduce a communication amount between the camera body 200 and the use lens unit 220 in the aperture control and improve the responsiveness of the aperture control.

In S161, the aperture controller 206 transmits a relative aperture control command to the lens controller 219 via the camera and lens communication units 217 and 218. The relative aperture control command includes an aperture driving amount (referred to as a "differential driving amount" hereinafter) corresponding to a difference between the current F-number and the target F-number. The lens controller 219 performs the relative aperture control for the aperture 205 according to the received differential drive amount. The unit of the differential drive amount included in the relative aperture control command differs depending on the F-number resolution of the aperture 205 in the use lens unit 220, such as a unit of 1/256 stages or 1/8 stages.

In S162, the aperture controller 206 transmits a first absolute aperture control command to the lens controller 219. The first absolute aperture control command includes the open F-number as a predetermined F-number. Upon receiving the first absolute aperture control command, the lens controller 219 drives the aperture 205 to the open F-number.

Next, in S163, the aperture controller 206 transmits a second absolute aperture control command to the lens controller 219. The second absolute aperture control command includes the still image F-number (or evaluation F-number) as a target F-number. The lens controller 219 performs the aperture control so as to narrow the aperture 205 to the target F-number.

In this way, this embodiment selectively uses the absolute aperture control command and the relative aperture control compound according to whether the use lens unit 220 is the absolute aperture compatible lens or the relative aperture compatible lens. Upon receiving the absolute aperture control command, the lens controller 219 calculates the aperture drive amount from the current F-number in accordance with the target F-number included in the command, and drives the aperture 205. Hence, the system controller 201 in the camera controls the camera communication unit 217 and acquires the current F-number via the lens communication unit 218 from the lens controller 219 in order to calculate the aperture driving amount, as well as controlling to maintain information stored in an unillustrated memory in the system controller 201.

On the other hand, the lens controller 219 that has received the relative aperture control command can directly drive the aperture from the current F-number to the target aperture position according to the differential drive amount included in the command. Thus, the relative aperture control is more responsive to the aperture control than the absolute aperture control.

Calculation Processing of Accumulation Start Scheduled Time for First Frame

Referring now to a flowchart in FIG. 4, a description will be given of processing in which the system controller 201 calculates the accumulation start scheduled time for the first-frame still imaging in S103 in FIG. 2.

In S130, the system controller 201 determines whether the use lens unit 220 is a lens compatible with a query about the aperture control time from the camera body 200 (referred to as an "aperture-time query compatible lens" hereinafter). The above lens ID further contains information on whether the lens unit 220 is the aperture-time query compatible lens, and the system controller 201 performs this determination using the lens ID. If the use lens unit 220 is the aperture-time query compatible lens, the system controller 201 proceeds to S131, and if it is not the aperture-time query compatible lens, the system controller 201 proceeds to S135.

In S131, the system controller 201 determines based on the lens ID whether the used lens unit 220 is the absolute aperture compatible lens or the relative aperture compatible lens. If it is the absolute aperture compatible lens, the flow proceeds to S133, and if it is the relative aperture compatible lens, the flow proceeds to S132.

In S132, the system controller 201 acquires the relative aperture control time for still imaging use from the lens controller 219. When the use lens unit 220 is the aperture-time query compatible lens and the relative aperture compatible lens, the lens controller 219 includes a memory configured to store the relative aperture control time necessary to drive the aperture 205 from a certain F-number to another F-number by the relative aperture control, as information of a designed value etc. unique to the lens unit.

The system controller 201 transmits a relative aperture-time query command to the lens controller 219. This command includes information indicating the current F-number and the still image F-number. The lens controller 219 reads the relative aperture control time out of the memory when the aperture 205 is driven by the relative aperture control from the received current F-number to the still image F-number, and sends it to the system controller 201.

On the other hand, in S133, the system controller 201 acquires the aperture opening time for still imaging use from the lens controller 219. When the use lens unit 220 is the aperture-time query compatible lens and the absolute aperture compatible lens, the lens controller 219 includes a memory configured to store the aperture opening time necessary to drive the aperture 205 from a certain F-number to the open F-number, as information of a designed value etc. unique to the lens unit.

The system controller 201 transmits an absolute aperture-time query command to the lens controller 219 via the lens communication unit 217. This command includes information indicating the current F-number and the open F-number. The lens controller 219 reads the aperture opening time out of the memory when the aperture 205 is driven by the absolute aperture control from the received current F-number to the open F-number and sends it to the system controller 201.

In S134, the system controller 201 acquires an aperture narrowing time for still imaging use from the lens controller 219. Where the use lens unit 220 is the aperture-time query compatible lens and the absolute aperture compatible lens, the memory in the lens controller 219 stores the aperture narrowing time necessary to narrow the aperture 205 from the open F-number to a certain F-number, as information of a designed value etc. unique to the lens unit.

The system controller 201 transmits an absolute aperture-time query command to the lens controller 219. This command includes information indicating the open F-number and the still image F-number. The lens controller 219 extracts from the memory the aperture narrowing time for driving the aperture 205 from the received open F-number to the still image F-number by the absolute aperture control and sends it to the system controller 201. The sum of the aperture opening time and the aperture narrowing time corresponds to the absolute aperture control time as the time required for the absolute aperture control. Thus, this embodiment obtains the relative or absolute aperture control time through acquisition processing that is different according to whether the lens unit 220 is the relative aperture compatible lens or the absolute aperture compatible lens.

In S135, the system controller 201 calculates the pre-imaging processing time necessary for the charge accumulation starts for the first-frame still imaging. If the use lens unit 220 is not the aperture-time query compatible lens in S130, the aperture control time cannot be acquired from the lens unit 220, so that the pre-imaging processing time is only the time required for the shutter preparation processing. The shutter preparation processing time contains information on a designed value unique to the shutter 207, etc., and this embodiment uses a predetermined fixed value.

If the relative aperture control time is acquired from the lens unit 220 in S132, the system controller 201 compares the shutter preparation processing time and the relative aperture control time with each other, and sets a longer time to the pre-imaging processing time. This is because the shutter preparation processing and the relative aperture control are performed in parallel. On the other hand, when acquiring the aperture opening time and the aperture narrowing time in S133 and S134, the system controller 201 compares the absolute aperture control time obtained by adding the aperture opening time and the aperture narrowing time to each other, with the shutter preparation processing time, and sets a longer time to the pre-imaging processing time.

In S136, the system controller 201 compares the pre-imaging processing time with the release stabilization time. If the release stabilization time is longer, the flow proceeds to S137, and if the pre-imaging processing time is longer, the flow proceeds to S138.

In S137, the system controller 201 sets the accumulation start scheduled time for the first-frame still imaging to the time obtained by adding the release stabilization time to the current time, and ends this flow.

In S138, the system controller 201 sets the accumulation start scheduled time for the first-frame still imaging to the time obtained by adding the pre-imaging processing time to the current time, and ends this flow.

As described above, a change of the image plane position can be predicted based on the time required for the aperture control by calculating the accumulation start scheduled time for the first-frame still imaging. Further, it is possible to acquire the aperture control time according to whether the use lens unit 220 is the aperture-time query compatible lens, and the absolute or relative aperture compatible lens, and to properly set the accumulation start scheduled time for the first-frame still imaging.

When the use lens unit 220 is the relative aperture compatible lens, the relative aperture control time may not be acquired irrespective of whether it is the aperture-time query compatible lens. The aperture control time in the relative aperture control is shorter than that in the absolute aperture control that drives the aperture to the open F-number once and then narrows it. Thus, there are few cases where the relative aperture control time is considered as the pre-imaging processing time. Unacquiring the relative aperture control time can reduce a communication amount between the camera body 200 and the use lens unit 220 in the consecutive imaging, and improve the control responsiveness in other communications such as a focus control.

The relative aperture-time query command used to acquire the relative aperture control time in S132 may include a differential drive amount from the current F-number to the target F-number. Then, the memory in the lens controller 219 stores the aperture driving time according to the differential driving amount from the current F-number to the target F-number. The communication for the relative aperture control corresponding to S161 in FIG. 3 may be simultaneous with the communication for acquiring the relative aperture control time in S132. Since both the relative aperture-time query command and the relative aperture control command include the differential drive amount from the current F-number to the target F-number, the differential drive amount can be sent from the camera body 200 to the use lens unit 220 in a single communication.

Calculation Processing of Accumulation Start Scheduled Time for Next-Frame Still Imaging Referring now to a flowchart in FIG. 5, a description will be given of the processing in which the system controller 201 calculates the accumulation start scheduled time for the next-frame still imaging in S108 and S119 in FIG. 2.

In S140, the system controller 201 determines based on the lens ID whether the use lens unit 220 is the aperture-time query compatible lens. If so, the flow proceeds to S141, and if not, the flow proceeds to S150.

In S141, the system controller 201 determines whether the use lens unit 220 is the absolute aperture compatible lens or the relative aperture compatible lens. If it is the absolute aperture compatible lens, the flow proceeds to S143, and if it is the relative aperture compatible lens, the flow proceeds to S142.

In S142, the system controller 201 acquires the relative aperture control time. Details of the processing performed here will be described later.

In S143, the system controller 201 determines whether the evaluation F-number for the next frame accords with the still image F-number for the next frame. If so, the flow proceeds to S144, and if not, the flow proceeds to S146.

Figure 4:
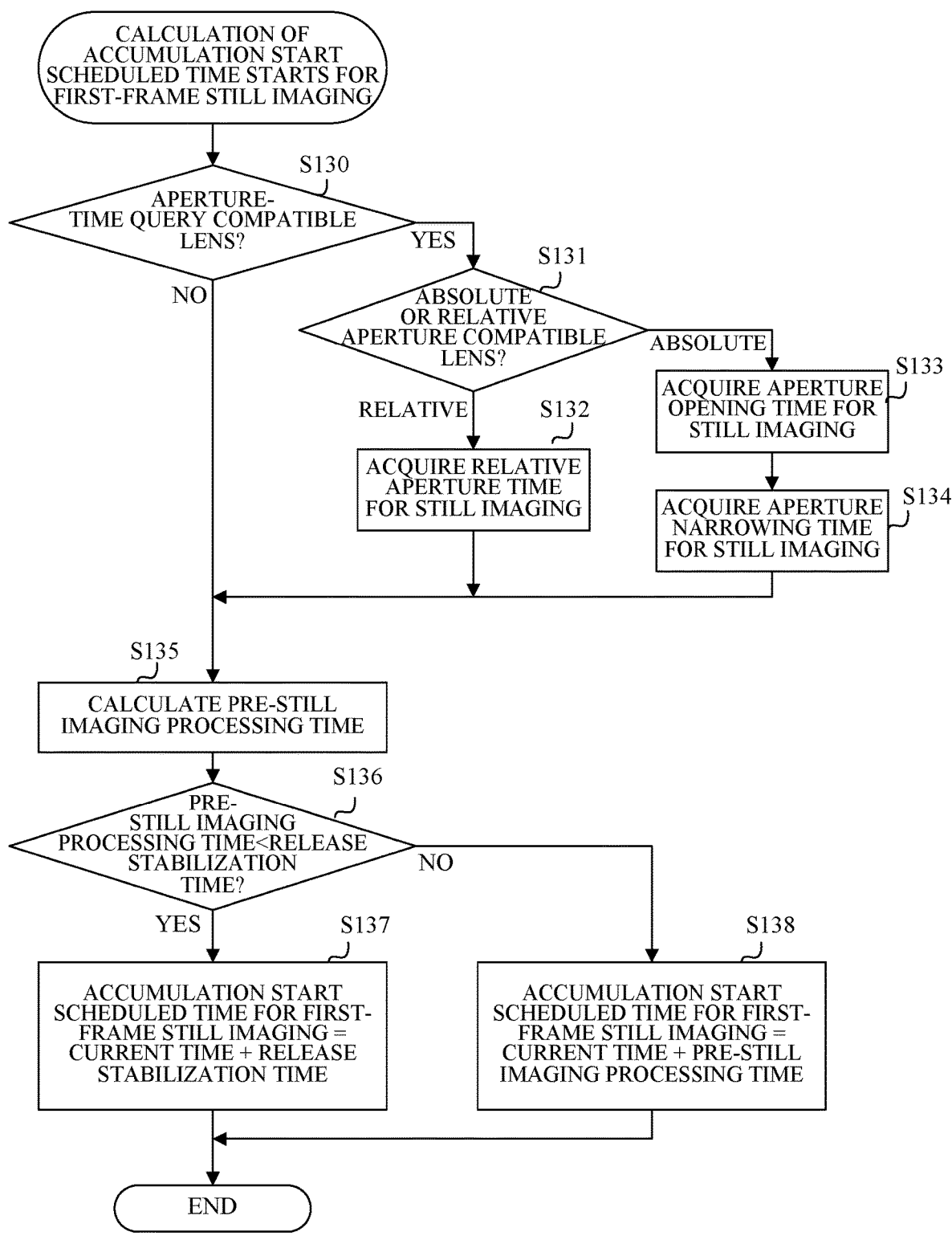
FIG. 4 is a flowchart illustrating calculation processing of a still image accumulation time according to the first embodiment.

In S144, similar to S133 in FIG. 4, the aperture opening time for the next still imaging is acquired.

Next, in S145, similar to S134 in FIG. 4, the aperture narrowing time for the next still imaging is acquired.

In S146, the system controller 201 acquires the aperture opening time for evaluation imaging from the lens controller 219. Where the evaluation F-number for the next frame does not accord with the still image F-number for the next frame, it is necessary to initially drive the aperture 205 to the evaluation F-number and then to drive it to the still image F-number, so that the aperture control time is required.

In S147, the system controller 201 acquires the aperture narrowing time for evaluation imaging from the lens controller 219. Herein, the system controller 201 includes the open F-number and the next evaluation F-number in the absolute aperture-time query command to be transmitted to the lens controller 219 in order to obtain the aperture narrowing time. Thereby, the lens controller 219 can acquire the aperture narrowing time required for driving the aperture from the open F-number to the evaluation F-number by the absolute aperture control.

Next, in S148, the system controller 201 acquires the aperture opening time for still imaging from the lens controller 219. Since the absolute aperture-time query command includes the evaluation F-number and the open F-number, the aperture opening time necessary to drive the aperture from the evaluation F-number to the open F-number by the absolute aperture control can be obtained.

Next, in S149, the system controller 201 acquires an aperture narrowing time for still imaging from the lens controller 219. This processing is the same as S134 in FIG. 4 described above. Thereafter, the system controller 201 proceeds to S150.

In S150, the system controller 201 calculates the pre-imaging processing time required to start the charge accumulation for the next-frame still imaging. If the use lens unit 220 is not the aperture-time query compatible lens in S140, the aperture control time is not acquired. Hence, the pre-imaging processing time is calculated by adding the time required to complete reading the accumulated charges for the previous frame still imaging (referred to as a "still image reading time" hereinafter) to the time necessary for the next evaluation imaging and for reading a signal corresponding to the accumulated charges (referred to as a "reading time for evaluation use" hereinafter). Both the still image reading time and the reading time for evaluation use are information such as the designed values unique to the image sensor 209, and this embodiment uses a predetermined fixed value.

The charge accumulation time for the next evaluation imaging is set by the just previous light metering calculation (or the light metering calculation in S102 in case of S108, the light metering calculation in S118 in case of S119) as described above.

After acquiring the aperture opening time and the aperture narrowing time for still imaging in S144 and S145, the system controller 201 compares the time made by adding the aperture opening time and the aperture narrowing time to each other in S150 with the time to complete the still image reading of the previous frame. Then, a longer time is set to the pre-evaluation processing time. The sum of the next evaluation imaging and the accumulated charges reading time and the pre-evaluation processing time is set to a pre-imaging processing time.

In S146 to S149, the system controller 201 that has acquired the aperture opening time and the aperture narrowing time for the evaluation imaging, the aperture opening time and the aperture narrowing time for still imaging performs the following processing in S150. First, the system controller 201 compares the time made by adding the aperture opening time and the aperture narrowing time for evaluation imaging with the time to complete the still frame reading of the previous frame. Then, a longer time is set to the pre-evaluation processing time. Next, the time required for the next evaluation imaging and the reading of the accumulated charges and the aperture opening time and the narrowing time for still imaging is added to the pre-evaluation processing time so as to set the pre-imaging processing time.

In S151 after S150, the system controller 201 compares the pre-still image processing time with the frame rate stabilization time, proceeds to S152 when the frame rate stabilization time is longer, and proceeds to S153 when the pre-still image processing time is longer.

In S152, the system controller 201 sets the accumulation start scheduled time for the next-frame still imaging to the time obtained by adding the frame rate stabilization time to the current time, and then ends this flow.

In S153, the system controller 201 sets the accumulation start scheduled time for the next-frame still imaging to the time made by adding the pre-imaging processing time to the current time, and then ends this flow.

The relative aperture control time may not be acquired in S142. As described above, the aperture control time in the relative aperture control is shorter than that in the absolute aperture control that temporarily drives the aperture 205 to the open F-number once and then narrows it, so that the relative aperture control time may not be acquired so as to reduce a communication amount in the consecutive imaging. Further, S142 may determine whether the F-number (evaluation F-number) for the next evaluation imaging accords with the F-number (imaging F-number) for the next-frame still imaging, and acquire each aperture control time similar to the absolute aperture control. Then, the accumulation start scheduled time for still imaging may be set based on the relative aperture control time.

As described above, this embodiment can properly calculate the scheduled time corresponding to still imaging according to the aperture control (absolute or relative aperture control) corresponding to the lens unit 220 attached to the camera body 200. For example, a moving object can be predicted based on the thus calculated scheduled time, and the focus lens 203 can be driven based on the moving object prediction result so as to provide an accurately focused still image.

Second Embodiment

Next follows a description of a second embodiment according to the present invention. This embodiment sets the imaging time for capturing the still image based on the emission time of the flash light as the illumination light (referred to as a "flash light emission time" hereinafter). By setting the imaging time to the target time of the moving object prediction, the moving object can be captured at the still imaging time while the moving object is more likely to be focused.

Problem(s) to be Solved by Second Embodiment

The imaging apparatus includes a flash illumination unit and can emit the flash light in accordance with imaging (exposure) with a light emission amount corresponding to the distance or luminance of the object. In addition to the focus detection control and the light metering control, this imaging apparatus provides a dimming control just before the exposure, and controls the flash light emission amount in the imaging based on the result so as to provide imaging with an appropriate object luminance. One dimming control method drives the image sensor in a specific driving mode to accumulate and read the electric charges, and measures the object luminance from the read charges (signal) and the amount of flash light reaching the object.

More specifically, the aperture in the lens unit is initially set to a preset imaging F-number. Next, the image sensor is driven in a specific drive mode to accumulate and read the charges, and obtains the object luminance in the non-flash light emission from the read signal. Thereafter, while the flash light is slightly emitted, the image sensor is driven in the specific driving mode to accumulate and read the charges, and the object luminance in the flash light emission is obtained from the read signal. A flash light amount reaching the object can be obtained based on the difference between the object luminance without the flash light emission and the object luminance with the flash light emission, and a proper flash light emission amount for still imaging can be set based on the result.

When the obtained proper flash light emission amount is smaller than the minimum light emission amount that can be emitted by the flash illumination unit (referred to as a "minimum light emittale amount" hereinafter), the flash light emission amount is set to the minimum light emission possible amount. Then, an appropriate exposure to the object is obtained by lowering the shutter speed or by changing the F-number to the open side by an amount corresponding to the decreased ISO sensitivity as one of exposure parameters for still imaging, in order to maintain the proper exposure to a portion which the flash light does not reach, such as the background.

In order to keep focusing on the moving object by moving the focus lens in this still imaging with the flash light, it is necessary to drive the focus lens 203 based on the movement of the object. The moving object prediction as a method of considering the motion of the object sets the still imaging scheduled time to the target time of the moving object prediction, hut if the image plane position is predicted without considering the time necessary for the dimming control in calculating the target time of the moving object prediction, the target time of the moving object prediction may shift from the actual still imaging time and a still image may be defocused from the object.

Dimming Control

Referring now to a flowchart of FIG. 6, a description will be given of the dimming control performed by the system controller 201. When the user presses the shutter button in the operation unit 202, the system controller 201 sends an imaging start instruction to each unit in the camera body 200. Then, when the flash state detector 223 detects that the flash light emission is available, the system controller 201 sends an instruction to capture an image with the flash light to each unit in the camera body 200. In S300, the system controller 201 performs the evaluation imaging.

Next, in S301, the system controller 201 outputs an image signal corresponding to the charge accumulation from the image sensor 209.

Next, in S302, the system controller 201 instructs the focus detector 212 to perform the focus detection calculation using the image signal output from the image sensor 209, and the t meter 213 to perform the light metering calculation that calculates the object brightness based on the brightness evaluation value. In the focus detection calculation and the light metering calculation, the operation is performed to obtain the in-focus state and the proper exposure at the position of the specific object detected as the object information by the image processor 211. For example, the detected specific object is focused, the weight of the light metering result at the position of the specific object is increased, and the exposure setting is performed based on the light metering result. The charge accumulation time for the first-frame still imaging (second imaging) in the consecutive imaging and the charge accumulation time for the evaluation imaging (first imaging) following the first-frame still imaging are set based on this light metering calculation.

Next, in S303, the system controller 201 calculates the accumulation start scheduled time for still imaging. Details of the processing of calculating the accumulation start scheduled time will be described later.

Next, in S304, the system controller 201 uses the focus detection result and calculates a lens driving amount for driving the focus lens 203 to a position that is predicted to be focused on the object at the accumulation start scheduled time for still imaging. The method for calculating the lens driving amount is the same as the method described in S104 in the first embodiment. The accumulation starts while the object is accurately focused at the accumulation start time (imaging time) of the actual still imaging by driving the focus lens 203 based on the calculated lens driving amount.

In S305, the system controller 201 moves the focus lens 203 for focusing (focus control) through the focus controller 204 according to the lens driving amount obtained in S304. The system controller 201 controls the aperture 205 through the aperture controller 206 based on the brightness evaluation value of the object obtained by the light metering calculation, and sets the F-number so as to obtain the proper exposure. Details of the aperture control according to the use lens unit 220 will be described later.

Next, in S306, the system controller 201 performs the dimming control for setting the flash light emission amount for still imaging. Details of this dimming control will be described later.

In S307, the system controller 201 determines whether the F-number among the exposure parameters set by the dimming control in S306 is different from the F-number set in S305. If the F-number set in S306 is the same as the F-number set in S305, the system controller 201 starts accumulating the charges to acquire the still image data for recording use by the still imaging. If the F-number set in S306 is different from the F-number set in S305, the flow proceeds to S308 since it is necessary to perform the aperture control again.

In S308, the system controller 201 again calculates the accumulation start scheduled time for still imaging. Details of the method of calculating the accumulation start time will be described later.

In S309, similarly to S304, the system controller 201 calculates a lens driving amount for driving the focus lens to a position that is predicted to be focused on the object at the accumulation start scheduled time for still imaging. Then, the accumulation start scheduled time recalculated in S308 is used for the accumulation start scheduled time for still imaging used to calculate the image plane position of the object for calculating the lens driving amount.

In S310, the system controller 201 moves the focus lens 203 through the focus controller 204 according to the lens driving amount obtained in S309, and performs focusing for still imaging. The system controller 201 drives the aperture 205 through the aperture controller 206 in accordance with the brightness evaluation value obtained by the light metering calculation in the dimming control in S306, and obtains the proper exposure for still imaging. Details of the aperture control with which the lens unit is compatible will be described later.

After the focus control and the aperture control are completed, the system controller 201 starts accumulating the charges for still imaging.

The processing of S307 to S310 enables the still image to be captured with the object accurately focused even when the exposure parameter is changed by the dimming control (S306) and the still image is captured with an F-number different from the F-number set in S303.

Dimming Control

Referring now to a flowchart in FIG. 7, a description will be given of the dimming control performed by the system controller 201 in S306.

Figure 6:
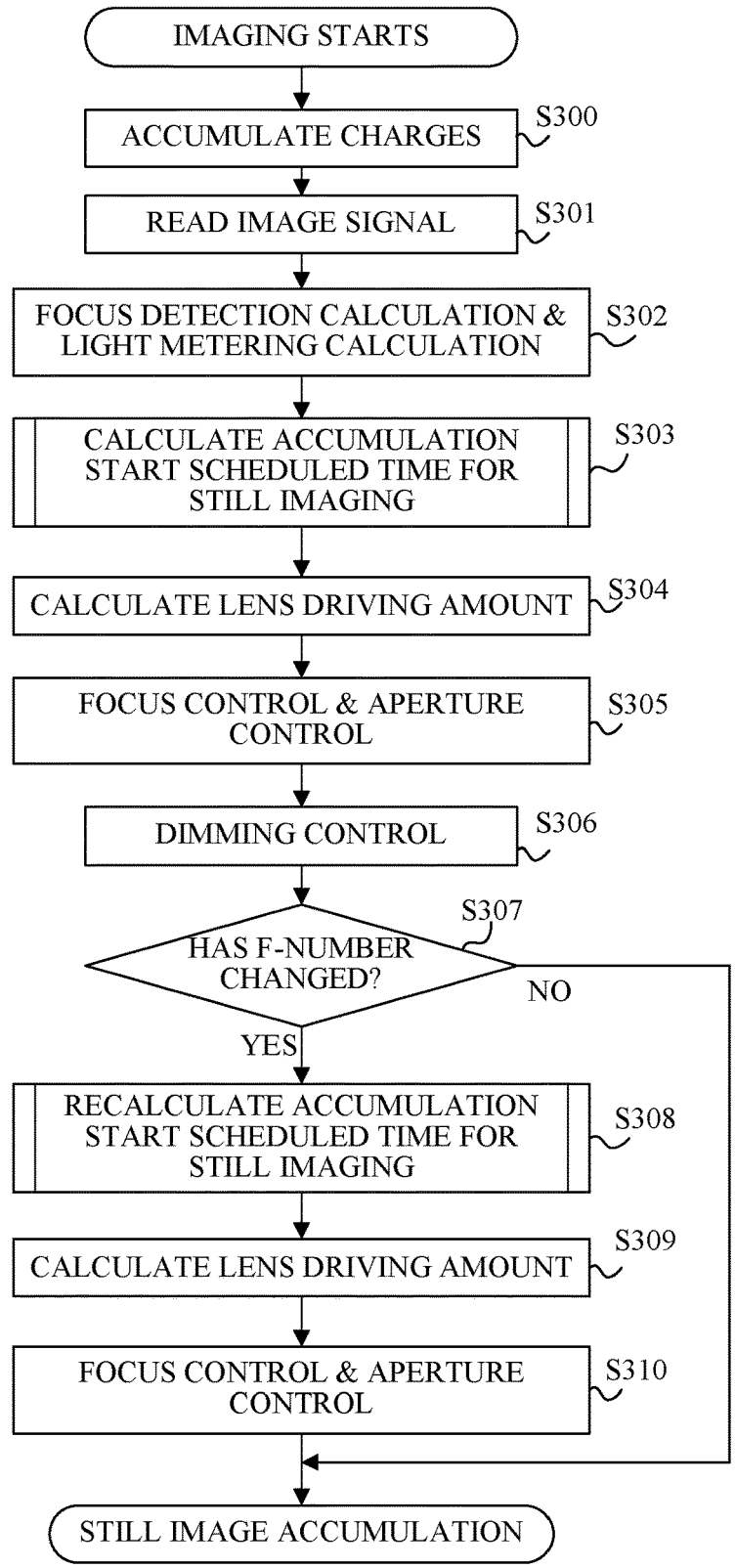
FIG. 6 is a flowchart illustrating imaging processing according to the second embodiment.
Figure 7:
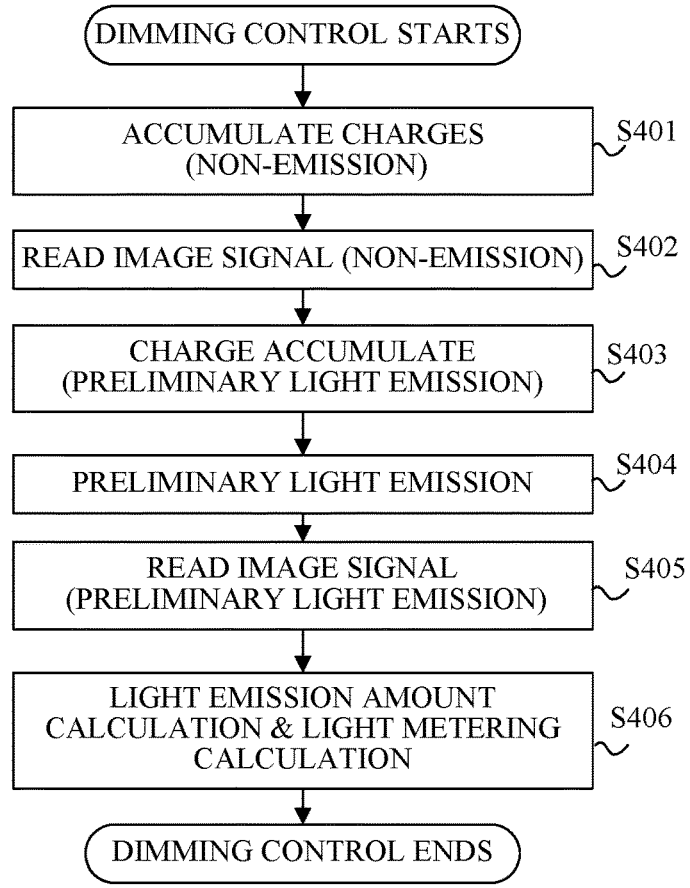
FIG. 7 is a flowchart illustrating dimming control processing according to the second embodiment.

The dimming control in S306 in FIG. 6 is performed in S401 to S406 in FIG. 7. First, in S401, the system controller 201 drives and instructs the image sensor 209 through the image sensor controller 210 to perform the charge accumulation so as to obtain the object luminance without the flash light emission necessary to calculate the flash light emission amount.

Next, in S402, the system controller 201 reads the charge amount accumulated in S401 from the image sensor 209, and notifies the light meter 213 of it. The light meter 213 detects the object luminance without the flash light emission according to the notified charge amount. The system controller 201 obtains a light metering value Ev0 as the light metering result.

Next, in S403, the system controller 201 instructs the image sensor 209 to accumulate the charges for obtaining the object luminance in the preliminary light emission in order to calculate the flash light emission amount.

In S404, the system controller 201 issues a command to the flash controller 221 and instructs the flash light emitter 222 to perform the preliminary light emission as soon as the charge accumulation starts in S403.

Next, in S405, the system controller 201 notifies the light meter 213 of the charge amount read from the image sensor 209 in S401. The light meter 213 measures the object luminance in the preliminary light emission according to the notified charge amount. Then, the system controller 201 obtains a light metering value Ev2 as the light metering result.

In S406, the system controller 201 calculates a difference between the light metering value Ev2 obtained in S405 and the light metering value Ev1 obtained in S402 as ΔEv=Ev2−Ev1 based on the following expression (1) to calculate a guide number GNo1 for obtaining the proper exposure. GNo. means a guide number. ΔEv means a light metering value, and a and h mean predetermined values.

$$GNo.=10^{a\times \Delta Ev\times b} \qquad (1)$$

When the guide number GNo1 is smaller than the minimum emittable amount of the flash light emitter 222, the guide number for still imaging is set to the minimum guide number value corresponding to the minimum light emittable amount and guarantees the object brightness by correcting the exposure parameter. Then, the exposure parameter in the actual still imaging may be different from the exposure parameter set before the dimming control. When the actual imaging F-number is different from the F-number set before the dimming control, the processing of S307 to S310 may perform the aperture control and the focus control again.

Figure 8:
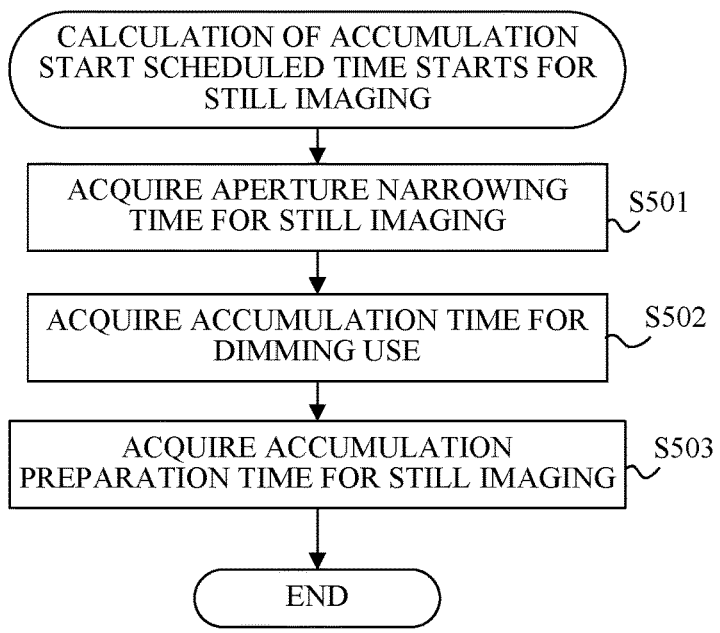
FIG. 8 is a flowchart illustrating calculation processing of a still image accumulation time according to the second embodiment.

Referring now to a flowchart in FIG. 8, a description will be given of the processing of calculating the accumulation start scheduled time of the image sensor 209 for still imaging accompanying with the dimming control (referred to as "dimming imaging" hereinafter).

Figure 3:
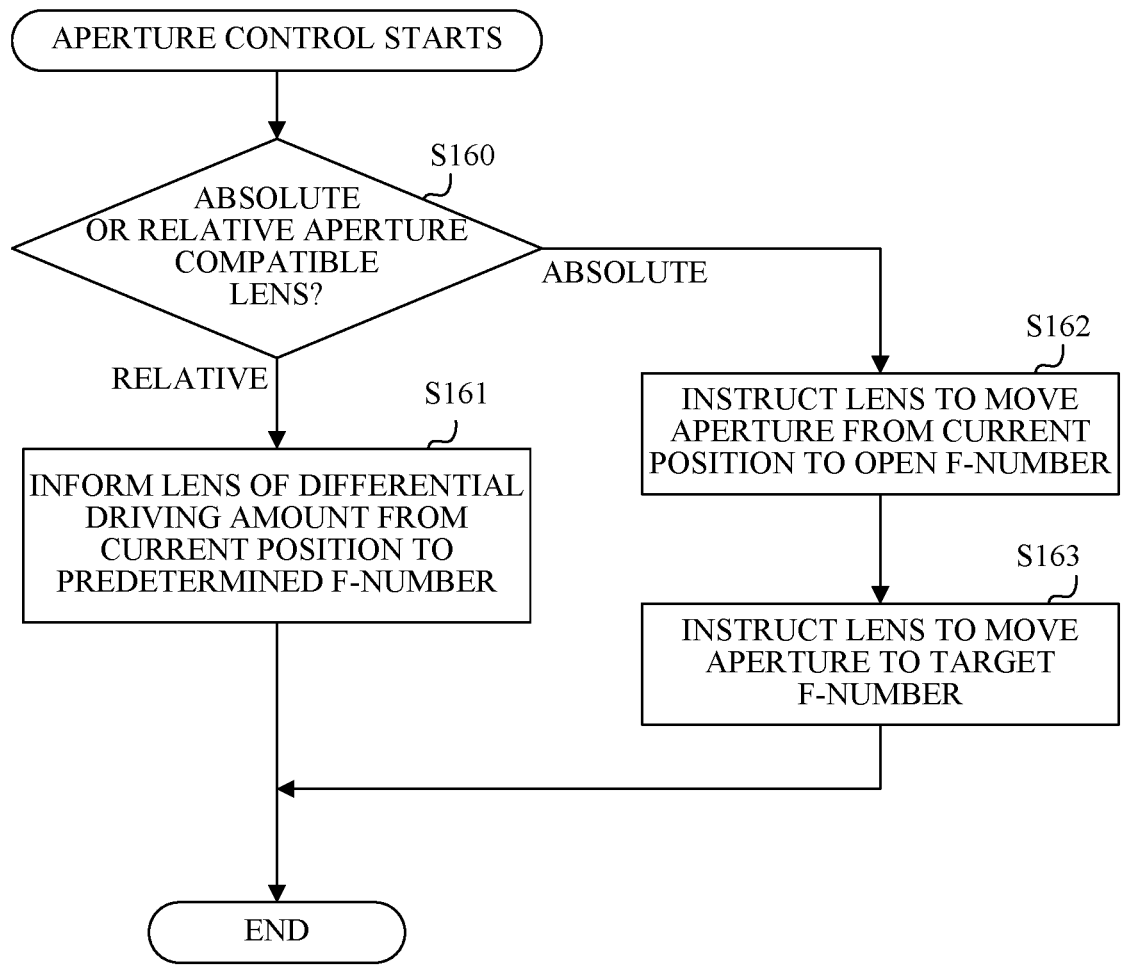
FIG. 3 is a flowchart illustrating aperture control processing according to the first embodiment.

In S303 in FIG. 3, the system controller 201 proceeds to S501 when calculating the accumulation start scheduled time for the next-frame still imaging.

In S501, the system controller 201 quires the use the lens unit 220 about and acquires the aperture control time necessary to drive the aperture from the current F-number to the imaging F-number.

In S502, the system controller 201 acquires the dimming control time, which is the time required for the dimming control, from the flash controller 221 and the image sensor controller 210. The dimming control time is made by addition to each other the time to accumulate and read the charges in the image sensor 209 for acquiring the object luminance without the flash light emission, and the time to accumulate and read the charges from the image sensor 209 for acquiring the object luminance with the flash light emission.

Next, in S503, the system controller 201 acquires from the image sensor controller 210 a mode change time required for the image sensor 209 to switch from the dimming control mode to the still image imaging mode.

The system controller 201 sets the accumulation start scheduled time for still imaging to a time made by summing up the current time, the aperture control time acquired in S501, the dimming control time acquired in S502, and the mode change time acquired in S503.

This embodiment can accurately calculate the accumulation start scheduled time for still imaging in the dimming imaging, which fluctuates depending on the dimming control of the camera body 200 and driving of the aperture 205 after the dimming control. Thus, for example, a change in the image plane position can be accurately predicted in accordance with the motion of the moving object, and the actual still imaging is accurately focused on the object at the accumulation start time.

Other Embodiments

The first embodiment discusses the processing of calculating the accumulation start scheduled time for the next-frame still imaging illustrated in FIG. 5, in which the different aperture control time is acquired or the accumulation start schedule time is acquired (calculated) by a different acquisition method depending on whether the used lens unit 220 is the absolute aperture compatible lens or the relative aperture compatible lens. However, when the use lens unit 220 is the relative aperture compatible lens, the aperture control time may be considered in some cases or may not be considered in other cases.

A description will now be given of examples in which the aperture control time is considered in some cases and is not considered in other cases, when the use lens unit 220 is the relative aperture compatible lens, depending on the type of the use lens unit 220.

For example, even with the relative aperture compatible lens, the aperture control time required for controlling the aperture 205 may be different depending on the performance of the motor that drives the aperture 205 and the performance of the aperture 205 itself.

Figure 9:
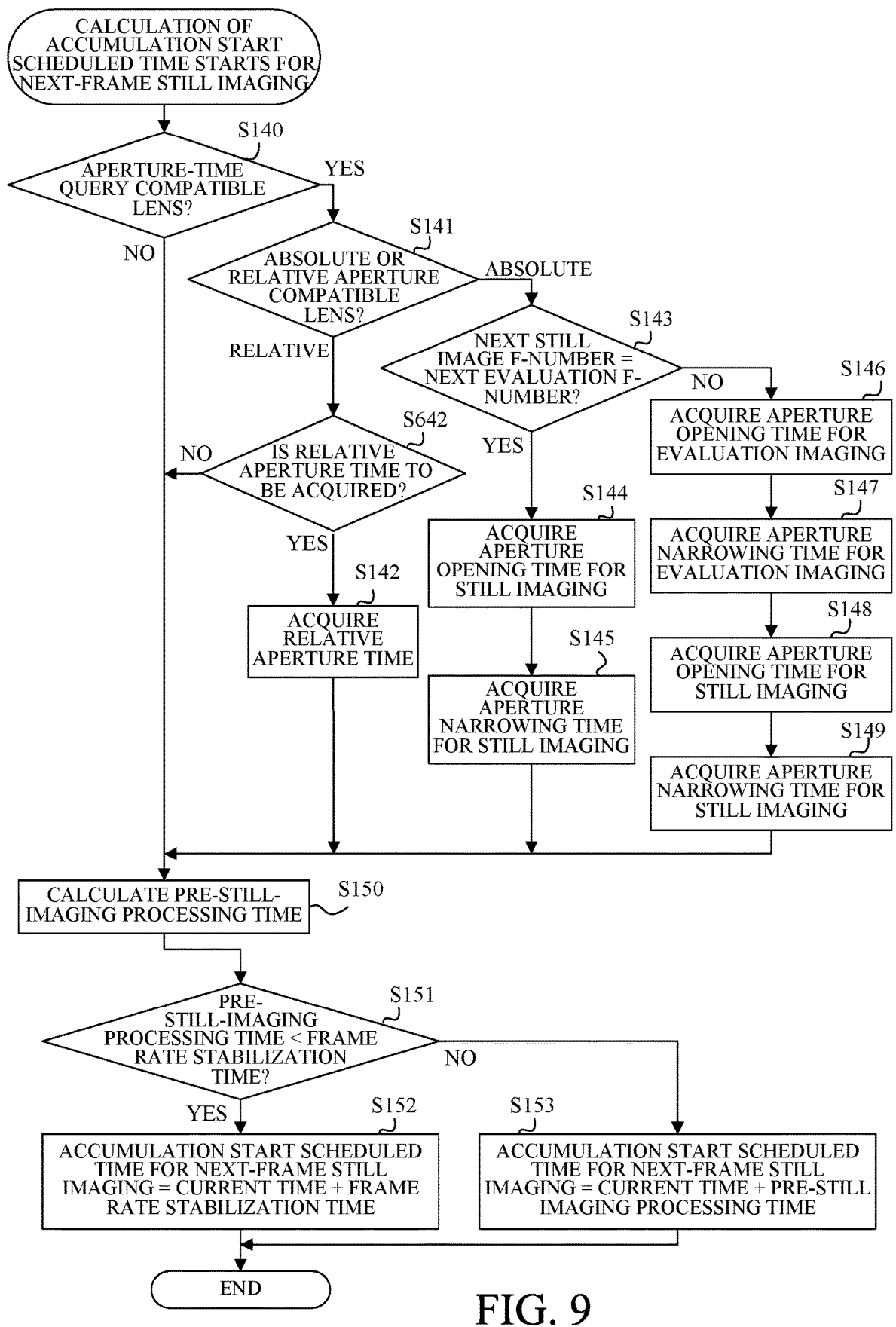
FIG. 9 is a flowchart illustrating consecutive imaging processing according to another embodiment.

A flowchart of FIG. 9 adds S642 to the flowchart of FIG. 5. In S141, the system controller 201 that determines that the use lens unit 200 is the relative aperture compatible lens proceeds to S642. In S642, the system controller 201 may determine based on the lens ID received from the lens unit 220 whether the use lens unit 220 is a first lens or a second lens, which will be described below, and may select whether the aperture control time is to be considered in setting the accumulation start scheduled time for still imaging in accordance with the determination result.

The first lens is, for example, a lens for which the accumulation start scheduled time for still imaging should be calculated based on the relative aperture control time. The second lens is a lens for which the accumulation start scheduled time for still imaging should be calculated without considering the relative aperture control time. For example, the aperture control time of the second lens that has a motor configured to drive the aperture 205 at a first speed is shorter that of the first lens having a motor configured to drive the aperture 205 at a second speed slower than the first speed.

Therefore, when the use lens unit 220 is the second lens, the camera body 200 may not acquire the aperture control time from the use lens unit 220 by placing the priority on the communication responsiveness between the use lens unit 220 and the camera body 200.

A range of the F-number for driving the aperture 205 when the open F-number is set to a first value is smaller than that when the open F-number is set to a second value smaller than the first value. Thus, the aperture control time is further shortened. Accordingly, when the open F-number is larger, the priority is placed to the communication responsiveness between the use lens unit 220 and the camera body 200, so that the camera body 200 may not acquire the aperture control time from the use lens unit 220.

Even when the use lens unit 220 is a lens compatible with the transmission of the aperture control time to the camera body 200, whether the aperture control time is considered may be selected according to the frame rate (consecutive imaging speed) in the consecutive imaging. For example, when the number of continuously captured frames per unit time is a first number, the aperture control time may be considered, and when the number is a second number smaller than the first number, the aperture control time may not be considered.

The first embodiment may not consider the aperture control time of the relative aperture compatible lens. In other words, S141 and S142 in FIG. 5 may be omitted, and the relative aperture compatible lens may be treated as a lens that is not the aperture-time query compatible lens in S140. This is because it is unnecessary for the relative aperture control to pass through the open F-number unlike the absolute aperture control and the aperture control time for the relative aperture control is usually shorter than that for the absolute aperture control. In case of the relative aperture compatible lens having a small influence on the moving object prediction by the aperture control time, a communication between the use lens unit and the camera body concerning the relative aperture control can be omitted, a communication amount and a communication time are reduced, and the communication responsiveness is improved.

The consecutive imaging processing illustrated in FIG. 2 is processing where a shutter button capable of a two-stroke push operation is continuously fully pressed (SW2 ON). On the other hand, if the shutter button is continuously half-pressed (SW1 ON) but the fully pressed operation has not been performed, the moving object prediction may not consider the aperture control time even when the use lens unit is a lens compatible with the transmission of the aperture control time.

In other words, the camera body may instruct the use lens unit not to transmit the aperture control time until the shutter button is continuously fully pressed. Thereby, where the image quality demand is less severe than that of the still imaging, the communication amount and the communication time may be omitted and the communication responsiveness can be improved by omitting a communication between the use lens unit and the camera body.

The method of calculating the accumulation start scheduled time for still imaging explained in the first embodiment and FIG. 9 may be combined with the method of calculating the accumulation start scheduled time for still imaging described in the second embodiment. Since a shift can be made smaller between the accumulation start scheduled time for still imaging and the actual accumulation start time by combining these methods with each other, than that with only one of the methods, the object can be more accurately focused at the actual accumulation start time.

The above embodiment predicts the image plane position of the object at the charge accumulation scheduled time, and calculates the lens driving amount of the focus lens based on the predicted image plane position. However, another method may be used to calculate the lens driving amount. For example, the object distance information may be calculated based on a defocus amount as the focus detection result obtained by the focus detection calculation, and a change amount in the object distance may be predicted from the current time to the accumulation start scheduled time for the first-frame still imaging. A more specific method in this case will be described below.

The system controller 201 predicts the change amount in the object distance based on a focus detection result a1, its acquisition time t1, a focus detection result a2 obtained in S102, and its acquisition time t2 stored in the unillustrated memory in the system controller 201. More specifically, a change amount in the object distance up to the scheduled time can be predicted by calculating a change rate (a2−a1)/(t2−t1) of the object distance based on an object distance difference (a2−a1) and an acquisition time difference (t2−t1), and by multiplying the result by the time up to the accumulation start scheduled time for the first-frame still imaging calculated in S103. By calculating the lens driving amount of the focus lens based on a thus-calculated change amount in the object distance and by controlling driving of the focus lens based on the lens driving amount, similar to the above embodiment, the object may be accurately focused at the accumulation start time for the first-frame still imaging.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

Each of the above embodiments can obtain a still image that is accurately focused on a moving object, whether the aperture control which the mounted lens apparatus is compatible is the first aperture control or the second aperture control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-253841, filed on Dec. 28, 2017, which is hereby incorporated by reference herein in its entirety.

What is claimed is:

1. An imaging apparatus to which a lens apparatus having an aperture is attachable, the imaging apparatus comprising:
an image sensor;
an imaging controlling unit configured to control driving of the image sensor, so as to perform first imaging and second imaging performed after the first imaging;
an aperture controlling unit configured to perform an aperture control for driving the aperture before the second imaging using a light metering result obtained by the first imaging;
a focus detecting unit configured to perform a focus detection based on a signal output from the image sensor corresponding to the first imaging;
a calculating unit configured to calculate a first time corresponding to the second imaging; and
a focus controlling unit configured to perform a focus control for driving a focus lens to an in-focus position predicted at the first time based on a focus detection result,
wherein the calculating unit calculates the first time in accordance with whether the aperture control corresponding to the attached lens apparatus is a first aperture control for driving the aperture to a target aperture value via a predetermined aperture value from an aperture value before the aperture control or a second aperture control for driving the aperture to the target aperture value directly from the aperture value before the aperture control, and
wherein at least one processor or circuit is configured to perform a function of at least one of the units.

2. The imaging apparatus according to claim 1, wherein the calculating unit calculates the first time in consecutive imaging that repetitively performs the first imaging, the aperture control, the focus control, and the second imaging according to whether the aperture control corresponding to the lens apparatus is the first aperture control or the second aperture control.

3. The imaging apparatus according to claim 1, wherein the imaging controlling unit acquires an aperture control time as a time required for the aperture control in the attached lens apparatus, and calculates the first time in accordance with the aperture control time, and
wherein the imaging controlling unit acquires the aperture control time that is different in accordance with whether the aperture control corresponding to the lens apparatus is the first aperture control or the second aperture control.

4. The imaging apparatus according to claim 3, wherein the imaging controlling unit may perform acquisition processing for acquiring the aperture control time, the acquisition processing being different in accordance with whether the aperture control corresponding to the lens apparatus is the first aperture control or the second aperture control.

5. The imaging apparatus according to claim 1, wherein the imaging controlling unit acquires an aperture control time as a time required for the aperture control in the lens apparatus where the aperture control corresponding to the attached lens apparatus is the first aperture control, and calculates the first time in accordance with the aperture control time, and
wherein the imaging controlling unit calculates the first time without using the aperture control time where the aperture control corresponding to the attached lens apparatus is the second aperture control.

6. A lens apparatus attachable to an imaging apparatus comprising:
an aperture; and
a transmitting unit configured to transmit information to the imaging apparatus,
wherein the imaging apparatus controls driving of an image sensor, so as to perform first imaging and second imaging performed after the first imaging, perform an aperture control for driving the aperture before the second imaging using a light metering result obtained by the first imaging, perform a focus detection based on a signal output from the image sensor corresponding to the first imaging, calculate a first time corresponding to the second imaging, and perform a focus control for driving a focus lens to an in-focus position predicted at the first time based on a focus detection result, and calculates the first time in accordance with whether the aperture control corresponding to the attached lens apparatus is a first aperture control for driving the aperture to a target aperture value via a predetermined aperture value from an aperture value before the aperture control or a second aperture control for driving the aperture to the target aperture value directly from the aperture value before the aperture control, wherein the transmitting unit transmits the information for causing the imaging apparatus to calculate the first time according to the aperture control corresponding to the lens apparatus, and wherein at least one processor or circuit is configured to perform a function of at least one of the units.

7. The imaging apparatus according to claim 3, wherein the lens apparatus comprising:

a transmitting unit configured to transmit information to the imaging apparatus.

8. The imaging apparatus according to claim 1, further comprising a dimming controlling unit configured to perform a dimming control for a light emitter for emitting illumination light in the second imaging, based on the light metering result obtained by the first imaging, wherein the calculating unit acquires a dimming control time as a time required for the dimming control and calculates the first time according to the dimming control time.

9. The imaging apparatus according to claim 8, wherein the calculating unit again calculates the first time and again performs the focus control when changing the aperture value of the aperture corresponding to the light metering result by the dimming control.

10. A control method of an imaging apparatus to which a lens apparatus having an aperture is attachable, the control method comprising steps of:

controlling driving of an image sensor, so as to perform first imaging and second imaging performed after the first imaging;

performing an aperture control for driving the aperture before the second imaging using a light metering result obtained by the first imaging;

performing a focus detection based on a signal output from the image sensor corresponding to the first imaging;

calculating a first time corresponding to the second imaging; and performing a focus control for driving a focus lens to an in-focus position predicted at the first time based on a focus detection result, wherein the calculating step calculates the first time in accordance with whether the aperture control corresponding to the attached lens apparatus is a first aperture control for driving the aperture to a target aperture value via a predetermined aperture value from an aperture value before the aperture control or a second aperture control for driving the aperture to the target aperture value directly from the aperture value before the aperture control.

11. A non-transitory computer-readable storage medium for storing a computer program for causing a computer of an imaging apparatus to which a lens apparatus having the aperture is attachable, to execute processing in the control method according to claim 10.

12. An imaging apparatus to which a lens apparatus having an aperture is attachable, the imaging apparatus comprising:

an image sensor;

an imaging controlling unit configured to control driving of the image sensor, so as to perform imaging;

an aperture controlling unit configured to perform an aperture control for driving the aperture;

a focus detecting unit configured to perform a focus detection based on a signal output from the image sensor before time when the imaging is performed;

a calculating unit configured to calculate information corresponding to focus driving amount for focusing on an object position at the time when the imaging is performed based on (a) a result of the focus detection and (b) whether or not the aperture control corresponding to the attached lens apparatus is driving the aperture to a target aperture value via a predetermined aperture value from an aperture value before the aperture control; and a focus controlling unit configured to perform a focus control for driving a focus lens based on the information corresponding to focus driving amount, wherein at least one processor or circuit is configured to perform a function of at least one of the units.

13. The imaging apparatus according to claim 12, wherein when brightness of an object moving in an optical axis direction gradually becomes darker, even if the aperture controlling unit drives the aperture via an opened state, according to a variation in the brightness of the object, the calculating unit calculates the information corresponding to the focus driving amount for focusing on the object position of the object at each time when each imaging is performed while preventing insufficient driving for an in-focus position for the object at each time when each imaging is performed of consecutive imaging, wherein the object moving in the optical axis direction is an object that can be focused by the imaging apparatus according to a movement of the object when the brightness of the object does not vary.

14. The imaging apparatus according to claim 12, further comprising a determining unit configured to determine (b)whether or not the aperture control corresponding to the attached lens apparatus is driving the aperture to the target aperture value via the predetermined aperture value from the aperture value before the aperture control, using information received from the attached lens unit.

15. The imaging apparatus according to claim 14, wherein the information received from the attached lens unit indicates whether the aperture control corresponding to the attached lens apparatus is driving the aperture to the target aperture value via the predetermined aperture value from the aperture value before the aperture control or is driving the aperture to the target aperture value directly from the aperture value before the aperture control.

16. The imaging apparatus according to claim 12, wherein the calculating unit calculates the information corresponding to the focus driving amount for focusing on the object position at the time when the imaging is performed based on how long it takes for driving the aperture to the target aperture value via the predetermined aperture value from the aperture value before the aperture control.

17. The imaging apparatus according to claim 12, wherein the predetermined aperture value is an open aperture value.

18. A control method of an imaging apparatus to which a lens apparatus having an aperture is attachable, the imaging apparatus comprising steps of:
- controlling driving of an image sensor, so as to perform imaging; performing an aperture control for driving the aperture;
- performing a focus detection based on a signal output from the image sensor before time when the imaging is performed;
- calculating information corresponding to focus driving amount for focusing on an object position at the time when the imaging is performed based on (a) a result of the focus detection and (b) whether or not the aperture control corresponding to the attached lens apparatus is driving the aperture to a target aperture value via a predetermined aperture value from an aperture value before the aperture control; and
- performing a focus control for driving a focus lens based on the information corresponding to focus driving amount.

19. The control method according to claim 18, wherein when brightness of an object moving in an optical axis direction gradually becomes darker, even if the aperture controlling step drives the aperture via an opened state, according to a variation in the brightness of the object, the calculating step calculates the information corresponding to the focus driving amount for focusing on the object position of the object at each time when each imaging is performed while preventing insufficient driving for an in-focus position for the object at each time when each imaging is performed of consecutive imaging, and
- wherein the object moving in the optical axis direction is an object that can be focused by the imaging apparatus according to a movement of the object when the brightness of the object does not vary.

20. A non-transitory computer-readable storage medium for storing a computer program for causing a computer of an imaging apparatus to which a lens apparatus having an aperture is attachable, to execute processing in the control method according to claim 18.

* * * * *